(12) United States Patent
Ammann

(10) Patent No.: US 6,227,778 B1
(45) Date of Patent: May 8, 2001

(54) TOOL AND SPINDLE WITH CENTRIFUGAL FORCE CLAMPING

(75) Inventor: Beat Ammann, Sagno (CH)

(73) Assignee: Ballado Investments Inc., Panama (PA)

( * ) Notice: Subject to any disclaimer, the term of this patent is extended or adjusted under 35 U.S.C. 154(b) by 0 days.

(21) Appl. No.: 09/456,883

(22) Filed: Dec. 8, 1999

(51) Int. Cl.$^7$ ............................... B23C 5/26; B23B 31/14
(52) U.S. Cl. ..................... 409/232; 279/131; 408/239 A; 409/234
(58) Field of Search ..................... 409/232, 234; 269/48.1; 408/239 A; 433/127; 279/2.02, 129, 131

(56) References Cited

U.S. PATENT DOCUMENTS

| | | | |
|---|---|---|---|
| 3,672,256 | * 6/1972 | Kosmowski | 409/234 |
| 4,006,996 | * 2/1977 | Kasabian | 408/239 A |
| 4,979,853 | * 12/1990 | Field | 409/234 X |
| 5,147,165 | * 9/1992 | Tempest | 409/232 |
| 5,603,468 | * 2/1997 | Stahlecker et al. | 242/571.6 |

FOREIGN PATENT DOCUMENTS 944 283    12/1963 (GB) .

697260 * 11/1979 (SU) ..................................... 279/131

* cited by examiner

*Primary Examiner*—William Briggs
(74) *Attorney, Agent, or Firm*—Young & Thompson

(57) ABSTRACT

A description is given of a set (10) consisting of a spindle (1) and tool (2) for machining operations to remove shavings by means of rotation, wherein the clamping of tool (2) is accomplished by the action of centrifugal force acting on one or more of the parts that comprise the set, whereby said spindle (1) ends in a cylindrical cavity (3), inside of which is coaxially secured a cylindrical member (5), whose part that faces tool (2) has one or more diametral cuts (6) that divide it into two or more symmetrical portions (5s, 5t) that are able to bend outward in the radial direction under the action of centrifugal force, and wherein tang (7) of said tool (2) ends in a hollow cylindrical tube (7e) that is able to accommodate at least part of said portions (5s, 5t) of said cylindrical member (5), the walls of which have a thickness (S) that is equal to distance (D) between interior wall (3k) of said cylindrical cavity (3) of spindle (1) and the exterior wall of said cylindrical member (5), whereby during the above-mentioned machining operations tool (2) is clamped by the action of the radial outward bending of said portions (5s, 5t) of the latter which, by pushing on the interior surfaces of said hollow cylindrical tube (7e), deform it elastically and cause it to adhere to said interior wall (3k) of said cylindrical cavity (3) of spindle (1).

3 Claims, 2 Drawing Sheets

TOOL AND SPINDLE WITH CENTRIFUGAL FORCE CLAMPING

This invention pertains to the field of devices for machine tools that carry out machining operations by removing shavings such as drilling, reaming, grinding, etc. through the rotation of tool-carrying spindles.

More specifically, the sector to which the invention relates is that of sets that consists of a tool and a spindle, for which the clamping of the tool is accomplished by the action of the centrifugal force that acts on one or more parts that make up the sets themselves.

According to the state of the art, which corresponds to the description given in patent GB-A-944 283, a set of the type described above is produced by connecting a hollow cylindrical spindle to a tool, on whose tang one or more diametral cuts are made in such a way as to create two or more parts of the above-mentioned tang which, as the tool rotates under the action of centrifugal force, behave as brackets that are subjected to bending and expand radially, pushing against the cavity of the spindle and, by friction, clamping the tang itself and, consequently, the tool as well.

This approach, however, suffers from several limitations. First, since in the connection between the tang and the spindle there should be a very small amount of play, it is necessary to ensure very precise surface finishing of the parts that come into contact, to the detriment of the resulting coefficient of friction; this means that the kind of sets produced as described above turns out to be functional only at very high rotational speeds, and this limits their application.

Second, the machining of the various component parts is extremely delicate and very expensive.

Last but not least, it should also be considered that, in a set of the type described above, the tang, which deforms under the action of centrifugal force, "conicalizes" as it is deformed and consequently pushes against the cavity of the spindle virtually only at a set of points that form a circumference, unless appropriate conicalization in the opposite direction is provided for by means of expensive, fine grinding.

In order to avoid these drawbacks and limitations, the inventor of this invention has conceived of a set composed of a spindle and a tool which, with its shape, arrangement, and number of parts, makes it possible to obtain a clamping friction force that is approximately twice as high as those that can be achieved today at the same rotational speeds with tools of the same diameter.

The solution developed by the inventor also makes it possible to increase significantly the roughness that is acceptable in the parts that come into contact with one another under the action of centrifugal force and to produce the set that is the object of the invention by means of considerably less expensive machining operations.

The object of the invention is, in fact, a set composed of a spindle and a tool as described in the preamble to attached claim 1, characterized as set forth in the characterizing part of said claim.

A preferred embodiment of a set according to the invention will now be described, but said embodiment should be considered neither limiting nor binding with respect to various other implementations that can be achieved based on the teaching contained in the attached claim.

In the description given below, reference will also be made to the attached drawings, where:

Figure 1:
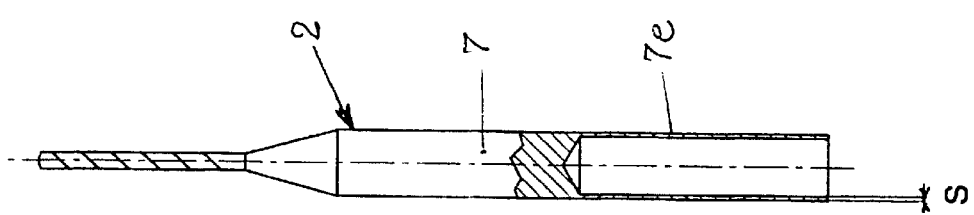
FIG. 1 shows a partial lateral sectional view of a tool designed according to the invention, i.e., with the tang ending in a hollow tube.

Looking first at FIG. 1, there is a tool 2 of a set 10 according to the invention (shown in FIG. 3) which has tang 7, which ends in a hollow cylindrical tube 7e, the thickness of whose wall is equal to a few tens of mm, indicated by S in the figure.

Figure 2:
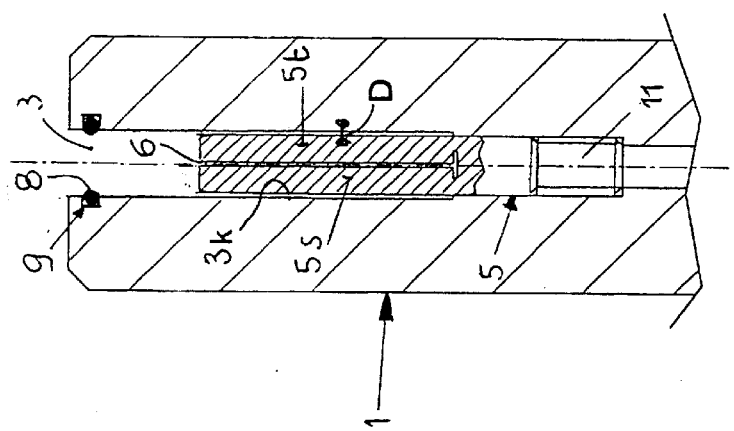
FIG. 2 shows a longitudinal section of a spindle produced according to the invention, inside of which is a cylindrical member that is able to expand radially under the action of centrifugal force.

Then, FIG. 2 shows how spindle 1 of the set in question has a cylindrical cavity 3 that is able to hold at least a portion of said tang 7 of above-described tool 2.

A cylindrical member 5, which is attached to the body of spindle 1 (in the case in question, by screwing onto one of its threaded ends 11), is inserted coaxially into said cavity 3.

The part of cylindrical member 5 that faces the area where tool 2 is inserted has one (or more) symmetrical portions 5s, 5t that can bend outward in the radial direction when the rotation of spindle 1 causes centrifugal force to act on them.

Figure 3:
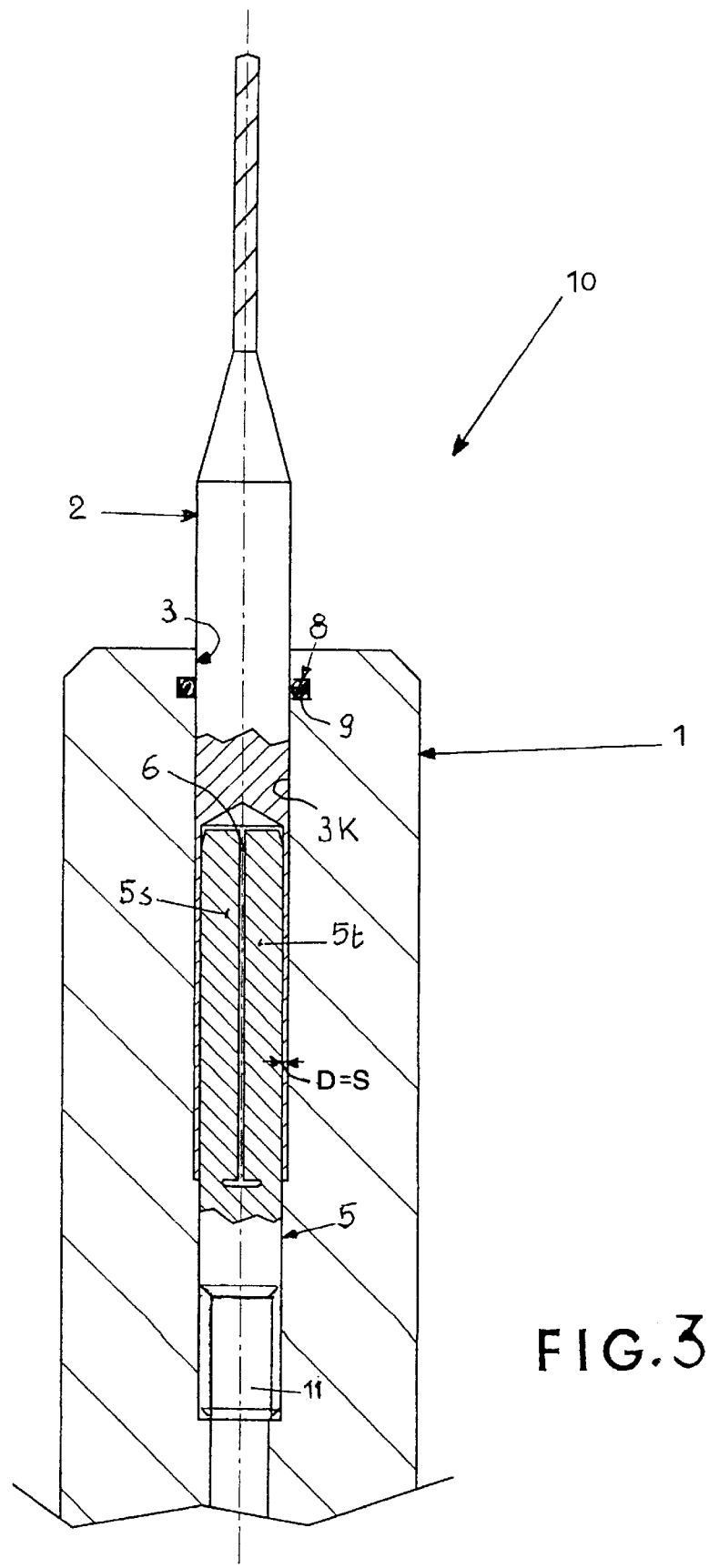
FIG. 3 shows an enlarged longitudinal section of the set according to the invention that is produced by putting the tool shown in FIG. 1 together with the spindle shown in FIG. 2.

Distance D between the exterior walls of cylindrical member 5 and interior wall 3k of said cylindrical cavity 2 is essentially equal to above-mentioned thickness S of tube 7e in which tang 7 of tool 2 ends; as FIG. 3 shows, said tang can therefore be used with said tube 7e is inserted between cylindrical member 5 and said interior wall 3k of cylindrical cavity 3 of spindle 1.

When set 10, assembled in this way, is caused to rotate in order to carry out a machining operation, portions 5s, 5t of cylindrical member 5, which expand radially outward owing to the bending caused by centrifugal force, press on the interior surfaces of said tube 7e of tang 7 of tool 7i, thereby deforming said tube elastically and causing it to adhere firmly to above-mentioned internal part 3k of cylindrical cavity 3 of spindle 1.

In this situation tool 2 is kept clamped under the action of centrifugal force owing to the friction that is created either between cylindrical member 5 and tube 7e or between the latter and interior wall 3k of hollow cavity 3 of spindle 1. All other things being equal, however a centrifugal force of a given intensity creates essentially twice as much friction as would be generated in a set of the known type, describe above.

Moreover, since extremely tight tolerances are not required in the connection between cylindrical member 5 and tube 7e of tool 2, their surface that come into contact can be machined to leave a certain amount of roughness, which increases the relative coefficient of friction.

It is also clear how tube 7e presses from the inside of cylindrical member 5 and thrust exerted by said tube is distributed over virtually the entire cylindrical contact surface between tube 7e and cavity 3 of spindle 1.

Thus all of these advantages that the inventor proposed to achieve with the set of his invention are indeed achieved.

What is claimed is:

1. Set (10) consisting of a spindle (1) and tool (2) for machining operations to remove shavings by means of rotation, wherein the clamping of tool (2) is accomplished by the action of centrifugal force acting on one or more of the parts that comprise the set, whereby said spindle (1) ends in a cylindrical cavity (3), inside of which is coaxially secured a cylindrical member (5), whose part that faces tool (2) has one or more diametral cuts (6) that divide it into two or more symmetrical portions (5s, 5t) that are able to bend outward in the radial direction under the action of centrifugal force, and wherein tang (7) of said tool (2) ends in a hollow cylindrical tube (7e) that is able to accommodate at least part of said portions (5s, 5t) of said cylindrical member (5), the walls of which have a thickness (S) that is equal to distance (D) between interior wall (3k) of said cylindrical cavity (3) of spindle (1) and the exterior wall of said cylindrical member (5), whereby during the abovementioned machining operations tool (2) is clamped by the action of the radial bending outward of said portions (5s, 5t) of the latter which, by pushing on the interior surfaces of said hollow cylindrical tube (7e), deform it elastically and cause it to adhere to said interior wall (3k) of said cylindrical cavity (3) of spindle (1).

2. Set according to claim 1, wherein said tool (2) is kept stationary relative to spindle (1) when the latter rotates at a speed that is below a preset value under the action of the pressure exerted on it by an elastic packing (8) that is held in a recess (9) on interior wall (3k) of said cylindrical cavity (3) of spindle (1) itself.

3. Set according to claim 1 wherein said cylindrical member (5) is secured coaxially in said cylindrical cavity (3) of spindle (1) by the screwing of its one threaded end (11) in the body of spindle (1) itself.

* * * * *